United States Patent
Amin et al.

(10) Patent No.: US 9,434,407 B2
(45) Date of Patent: Sep. 6, 2016

(54) WAKE-UP CIRCUIT IN AN ELECTRIC STEERING SYSTEM

(71) Applicant: STEERING SOLUTIONS IP HOLDING CORPORATION, Saginaw, MI (US)

(72) Inventors: Ishtiaque Amin, Saginaw, MI (US); Philip G. Bright, Auburn, MI (US); Paul M. Fisher, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/455,982

(22) Filed: Aug. 11, 2014

(65) Prior Publication Data
US 2014/0350795 A1     Nov. 27, 2014

Related U.S. Application Data

(63) Continuation-in-part of application No. 13/106,031, filed on May 12, 2011, now Pat. No. 8,862,328.

(60) Provisional application No. 61/334,835, filed on May 14, 2010.

(51) Int. Cl.
*B62D 5/04* (2006.01)
*B62D 15/02* (2006.01)
*H02P 6/18* (2016.01)

(52) U.S. Cl.
CPC .......... *B62D 5/0481* (2013.01); *B62D 15/021* (2013.01); *B62D 15/0235* (2013.01); *H02P 6/182* (2013.01)

(58) Field of Classification Search
CPC .. G01D 5/2451; B62D 15/02; B62D 15/021; B62D 15/0235
USPC ............................................................ 701/42
See application file for complete search history.

(56) References Cited

U.S. PATENT DOCUMENTS 5,481,167 A * 1/1996 Rohrbaugh ............. H02P 6/182
318/400.04
5,936,524 A     8/1999 Zhevelev et al.
(Continued)

FOREIGN PATENT DOCUMENTS

DE     102012103092 A1     10/2013
EP       1726934 A1        11/2006
(Continued)

OTHER PUBLICATIONS

EP Application No. 11004000.3, Extended Search Report dated Sep. 12, 2012, 9 pages.
(Continued)

*Primary Examiner* — Aaron L Troost
(74) *Attorney, Agent, or Firm* — Cantor Colburn LLP

(57) ABSTRACT

In one aspect, a wake-up circuit is provided for triggering a determination of an absolute rotational position of a rotatable shaft of a motor in an electric power steering system of a vehicle. The wake-up circuit includes a plurality of inputs coupled to separate phases of the motor. A voltage boosting circuit is operable to increase a back electromotive force (EMF) voltage induced on one or more of the inputs by rotation of the rotatable shaft of the motor and produce at least one voltage-boosted back EMF voltage. A comparator circuit is operable to compare the at least one voltage-boosted back EMF voltage to a reference voltage and trigger a monitoring system to perform the determination of the absolute rotational position of the rotatable shaft of the motor in the electric power steering system based on a result of the compare during an ignition off state of the vehicle.

15 Claims, 7 Drawing Sheets

(56) References Cited

U.S. PATENT DOCUMENTS

| | | | |
|---|---|---|---|
| 6,400,142 | B1 | 6/2002 | Schroeder |
| 6,404,157 | B1* | 6/2002 | Simon .................. G05B 15/02 |
| | | | 318/264 |
| 6,498,749 | B1 | 12/2002 | Cuppens et al. |
| 6,498,971 | B2 | 12/2002 | Leaphart |
| 8,171,875 | B1 | 5/2012 | Caldwell et al. |
| 2003/0067243 | A1 | 4/2003 | Hollenbeck et al. |
| 2003/0218458 | A1 | 11/2003 | Seger et al. |
| 2004/0061473 | A1* | 4/2004 | Boys .................. H02P 1/26 |
| | | | 318/778 |
| 2008/0299938 | A1 | 12/2008 | Meshenberg |
| 2009/0322268 | A1 | 12/2009 | Imamura et al. |
| 2010/0045795 | A1 | 2/2010 | Jezierski et al. |
| 2010/0057299 | A1* | 3/2010 | Burgdorf ............. G01D 5/2451 |
| | | | 701/42 |
| 2010/0235052 | A1 | 9/2010 | Shartle et al. |

FOREIGN PATENT DOCUMENTS

| | | |
|---|---|---|
| EP | DE102006042104 | 4/2007 |
| EP | DE102006014700 | 9/2007 |
| EP | 1916176 A1 | 4/2008 |
| EP | 2386465 A2 | 11/2011 |

OTHER PUBLICATIONS

European Search Report; European Application No. 11009233.5; European Filing Date: Mar. 19, 2012; Date of Mailing: Apr. 4, 2012, 5 pages.

European Patent Application No. 15180435.8 Extended European Search Report dated Feb. 19, 2016, 7 pages.

* cited by examiner

WAKE-UP CIRCUIT IN AN ELECTRIC STEERING SYSTEM

CROSS REFERENCE TO RELATED APPLICATIONS

This application is a Continuation-In-Part of U.S. patent application Ser. No. 13/106,031 filed May 12, 2011, which claims the benefit of U.S. Provisional Application Ser. No. 61/334,835 filed May 14, 2010, the contents of which are incorporated herein by reference thereto.

FIELD OF THE INVENTION

The subject application relates to a wake-up circuit for triggering a determination of an absolute rotational position of a motor shaft in an electric steering system when a vehicle has an ignition off state.

BACKGROUND

A vehicle electric power steering system can utilize a monitoring system that monitors a motor shaft position in the electric power steering system. The monitoring system, however, is turned off when the ignition of the vehicle is off (i.e., an ignition off state of the vehicle). Accordingly, if a vehicle operator turns the steering wheel (i.e., handwheel) during the ignition off state, when the monitoring system is subsequently turned on during an ignition on state, the monitoring system may not be able to accurately determine an absolute rotational position of the motor shaft.

Accordingly, it is desirable to provide a system and a method for determining an absolute rotational position of a rotatable shaft of a motor in an electric power steering system during an ignition off state of the vehicle. While a system that determines absolute rotational position in an electric power steering system during an ignition off state of the vehicle can be effective by periodically checking the rotatable shaft position of the motor, abrupt steering wheel motion can be difficult to detect when monitoring is performed on a fixed periodic basis.

SUMMARY OF THE INVENTION

According to an embodiment, a wake-up circuit is provided for triggering a determination of an absolute rotational position of a rotatable shaft of a motor in an electric power steering system of a vehicle. The wake-up circuit includes a plurality of inputs coupled to separate phases of the motor. A voltage boosting circuit of the wake-up circuit is operable to increase a back electromotive force (EMF) voltage induced on one or more of the inputs by rotation of the rotatable shaft of the motor and produce at least one voltage-boosted back EMF voltage. A comparator circuit of the wake-up circuit is operable to compare the at least one voltage-boosted back EMF voltage to a reference voltage and trigger a monitoring system to perform the determination of the absolute rotational position of the rotatable shaft of the motor in the electric power steering system of the vehicle based on a result of the compare during an ignition off state of the vehicle.

According to another embodiment, a system is provided for determining an absolute rotational position of a rotatable shaft of a motor in an electric power steering system of a vehicle. The system includes a wake-up circuit with a voltage boosting circuit and a comparator circuit. The voltage boosting circuit is operable to increase a back EMF voltage induced on one or more inputs by rotation of the rotatable shaft of the motor and produce at least one voltage-boosted back EMF voltage. The comparator circuit is operable to compare the at least one voltage-boosted back EMF voltage to a reference voltage and output a control signal based on a result of the compare during an ignition off state of the vehicle. The system also includes a monitoring system having a microprocessor and first and second position sensors operable to generate signals indicative of a relative rotational position of the rotatable shaft. The microprocessor is configured to activate in response to the control signal and determine a current absolute position value indicating a current absolute rotational position of the rotatable shaft based on a previously stored absolute position value and an amount of relative rotation of the rotatable shaft based on the signals from the first and second position sensors.

According to a further embodiment, a method is provided for triggering a determination of an absolute rotational position of a rotatable shaft of a motor in an electric power steering system of a vehicle. The method includes increasing a back EMF voltage induced on one or more inputs from separate phases of the motor by rotation of the rotatable shaft to produce at least one voltage-boosted back EMF voltage. The at least one voltage-boosted back EMF voltage is compared to a reference voltage. A monitoring system is triggered to perform the determination of the absolute rotational position of the rotatable shaft of the motor in the electric power steering system of the vehicle based on a result of the comparison during an ignition off state of the vehicle.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
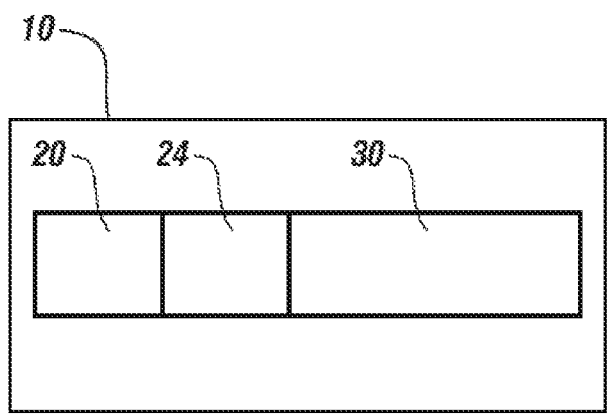
FIG. 1 is a block diagram of a vehicle having a handwheel, an electric power steering system, and a position determination system in accordance with an exemplary embodiment.
Figure 2:
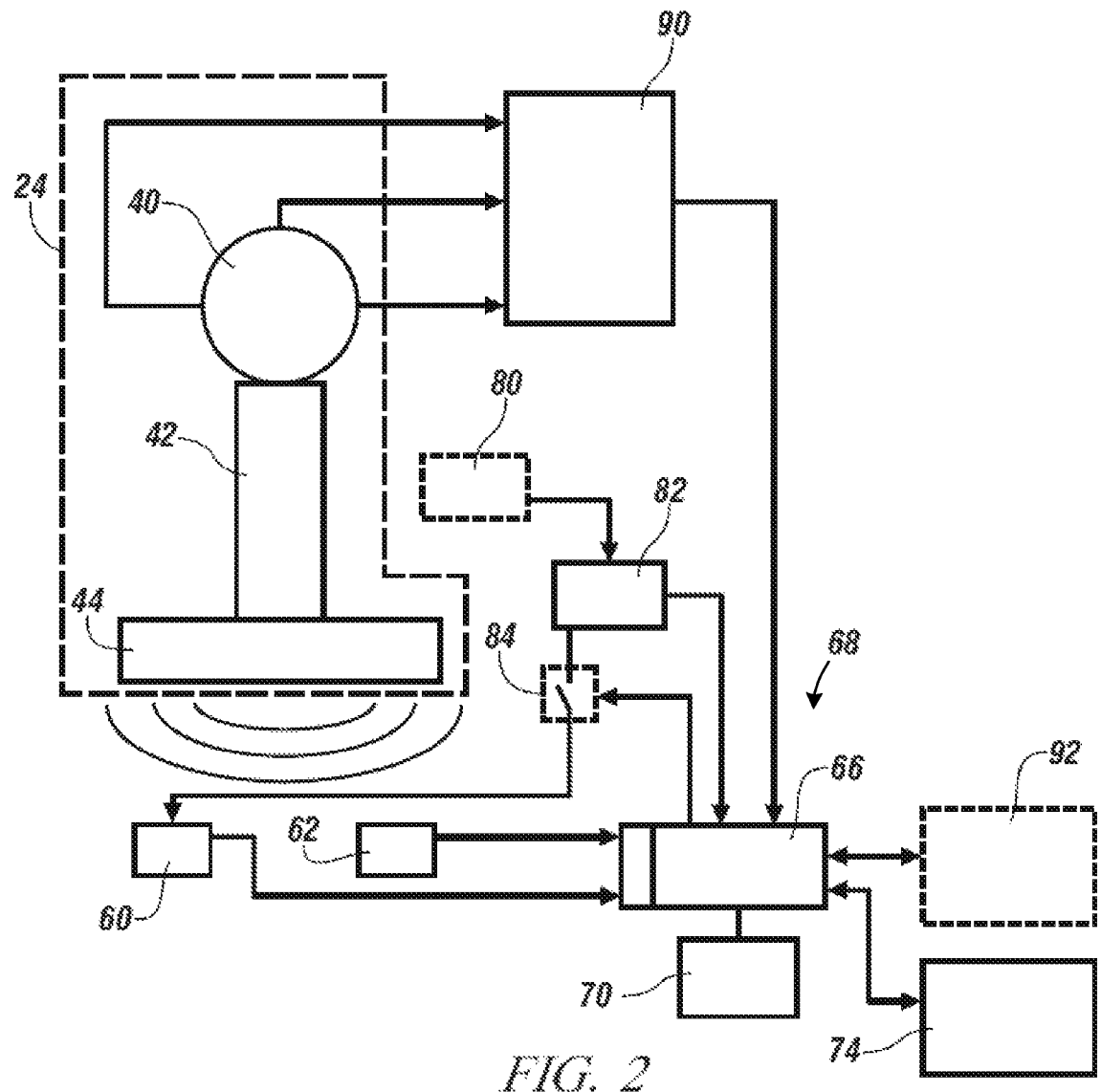
FIG. 2 is a block diagram of the electric power steering system and the position determination system shown in FIG. 1.

Referring now to FIGS. 1 and 2, a vehicle 10 having a handwheel 20, an electric power steering system 24, and a position determination system 30 in accordance with an exemplary embodiment is illustrated. The term "ignition off state" used herein corresponds to a power off state of an electric power steering system, and the term "ignition on state" corresponds to a power on state of an electric power steering system.

The handwheel 20 is operably coupled to the electric power steering system 24. Rotation of the handwheel 20 induces the electric power steering system 24 to cause rotation of a rotatable motor shaft 42 operably coupled to a rack-and-pinion assembly to move an operational position of vehicle wheels.

The electric power steering system 24 includes an electric motor 40 having the rotatable shaft 42 and a magnet 44 coupled to the rotatable shaft 42. In one embodiment, the rotatable shaft 42 is operably coupled via a gear assembly to a rack-and-pinion assembly for controlling an operational position of vehicle wheels.

The position determination system 30 is provided to determine an absolute rotational position of the rotatable shaft 42 of the motor 40 when the vehicle 10 has an ignition off state. The system 30 includes first and second position sensors 60, 62, a microprocessor 66, a timer circuit 70, a memory device 74, a power source 80, a voltage regulator 82, a switch 84, a wake-up circuit 90, and a main controller 92. The combination of the first and second position sensors 60, 62 and the microprocessor 66 may also be referred to as a monitoring system 68. The monitoring system 68 can also include other elements of the position determination system 30.

Figure 4:
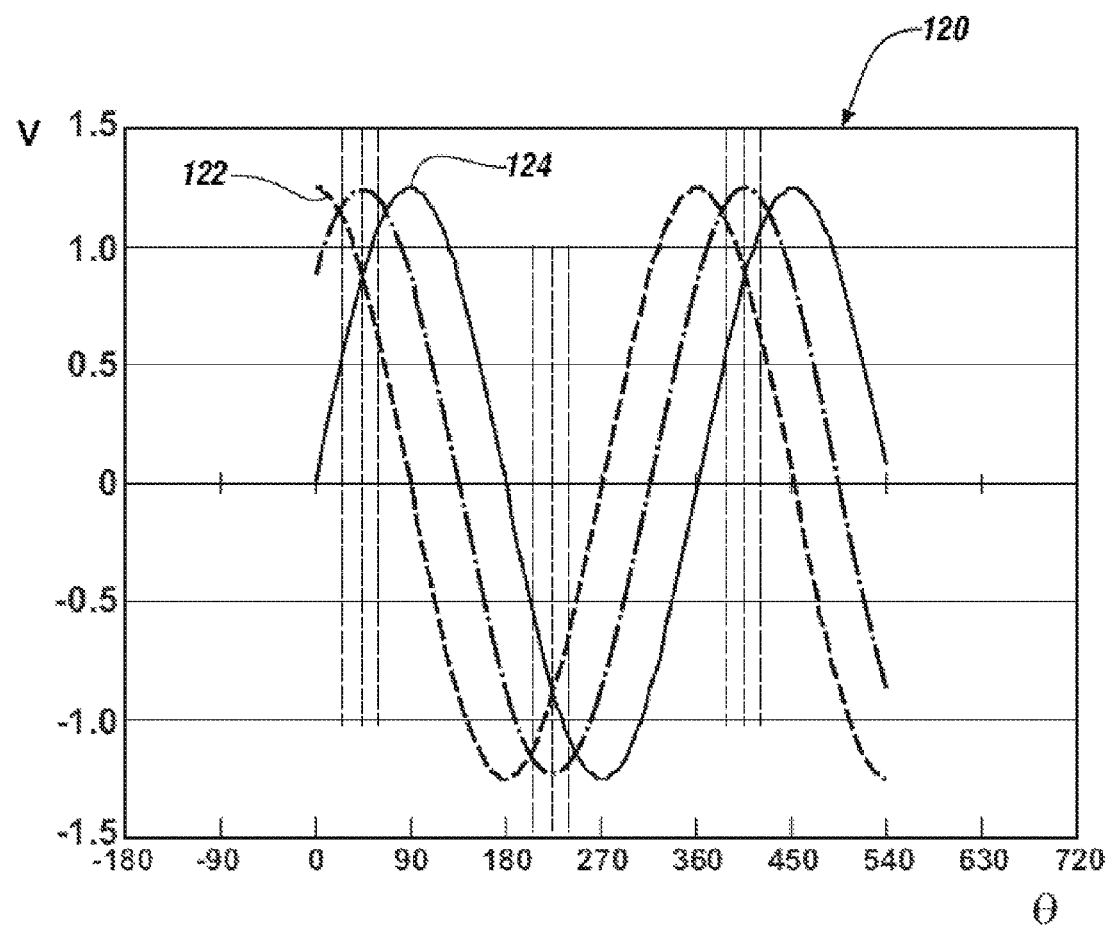
FIG. 4 is a graph of first and second signals generated by first and second position sensors utilized in the position determination system of FIG. 1.
Figure 5:
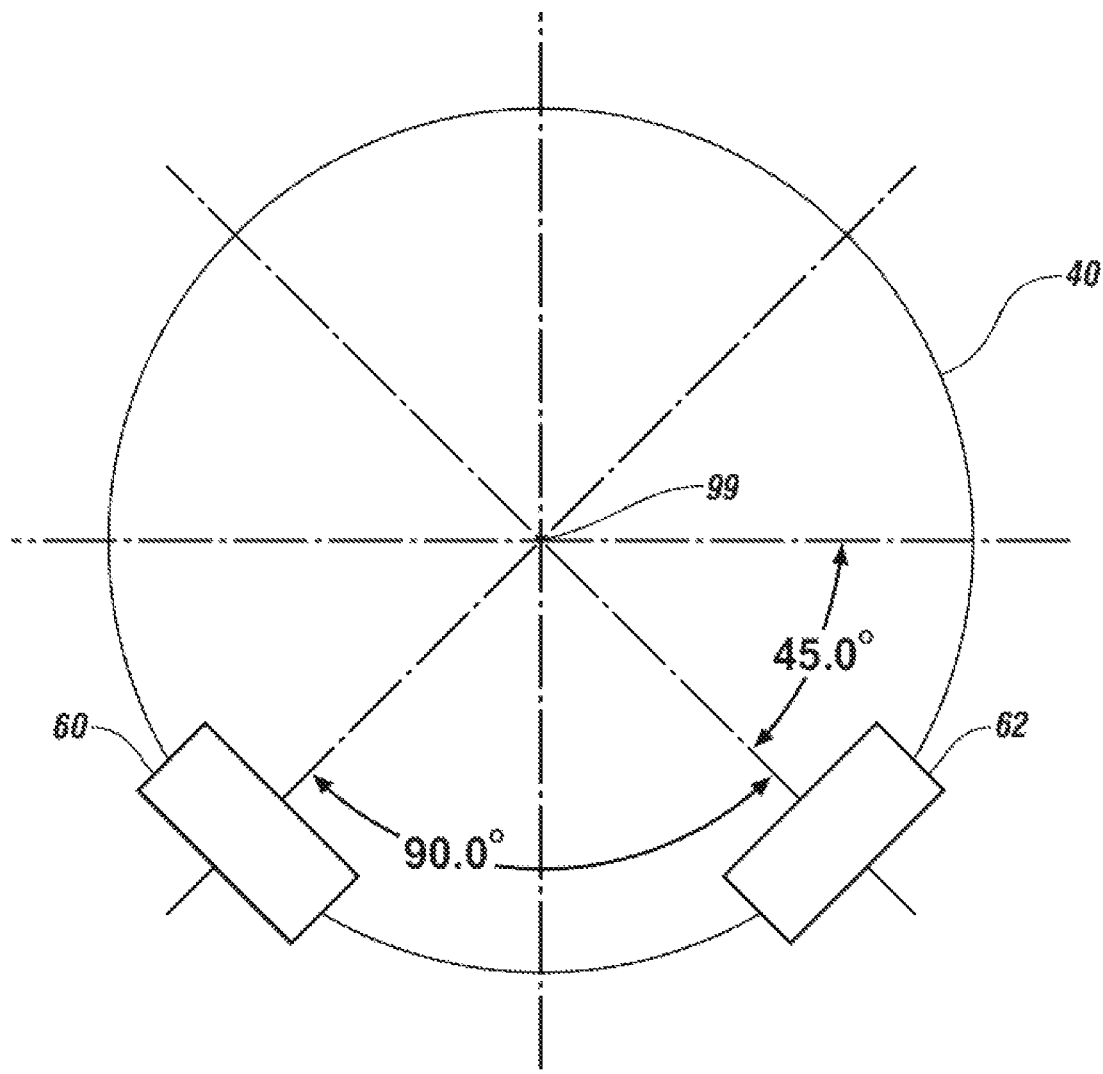
FIG. 5 is a block diagram illustrating exemplary positions of first and second position sensors utilized in the position determination system of FIG. 1.

Referring to FIGS. 2, 4 and 5, the first and second position sensors 60, 62 are configured to generate first and second signals indicative of a relative position of the rotatable shaft 42 of the motor 40. In one exemplary embodiment, the first and second position sensors 60, 62 are Hall effect sensors that generate the first and second signals, respectively, in response to detecting a magnetic field from the magnet 44 coupled to the rotatable shaft 42. In one exemplary embodiment, the first and second position sensors 60, 62 are disposed 90 degrees apart from one another about a central axis 99 of the rotatable shaft 42. As shown in FIG. 4, a graph 120 illustrates that the first position sensor 60 can generate a first signal over time represented by signal curve 122 as the rotatable shaft 42 and the magnet 44 are rotated. Also, the second position sensor 62 can generate a second signal over time represented by signal curve 124 as the rotatable shaft 42 and the magnet 44 are rotated.

The timer circuit 70 is operably coupled to the microprocessor 66. The timer circuit 70 is configured to periodically generate a control signal that activates the microprocessor 66 when the vehicle 10 has an ignition off state. In one exemplary embodiment, the timer circuit 70 generates the control signal every 256 milliseconds to activate the microprocessor 66. Of course, other time intervals are contemplated.

The memory device 74 is operably coupled to the microprocessor 66. The microprocessor 66 is configured to store data values in the memory device 74 as will be explained in greater detail below. The memory device 74 can also hold instructions for execution by the microprocessor. The microprocessor 66 can be any type of processing circuitry operable to execute instructions, such as a microcontroller, a digital signal processor, a general purpose processor, a gate array, an application-specific integrated circuit, and the like.

The power source 80 is configured to output a voltage which is regulated utilizing the voltage regulator 82. The voltage regulator 82 outputs an operational voltage that is received by the microprocessor 66 for powering the microprocessor 66.

The switch 84 is coupled between the voltage regulator 82 and the position sensors 60, 62. When the switch 84 has a closed operational position, an operational voltage from the voltage regulator 82 is supplied to the first and second position sensors 60, 62 to energize the position sensors 60, 62. Alternately, when the switch 84 has an open operational position, an operational voltage from the voltage regulator 82 is removed from the first and second position sensors 60, 62 to de-energize the position sensors 60, 62. In one exemplary embodiment, the switch 84 is a p-channel MOSFET that is switched to either the closed operational position or the open operational position by control signals from the microprocessor 66.

The wake-up circuit 90 is configured to compare the first, second, and third back electromotive force voltages from first, second, and third phases, respectively, of the motor 40 to a reference voltage. The wake-up circuit 90 outputs an interrupt/control signal that is received by the microprocessor 66 of the monitoring system 68 when either the first back electromotive force voltage is greater than the reference voltage, or the second back electromotive force voltage is greater than the reference voltage, or the third back electromotive force voltage is greater than the reference voltage, indicating that a rotational speed of the shaft 42 is greater than a threshold rotational speed. Of course, in an alternative embodiment, wake-up circuit 90 is configured to compare the first and second back electromotive force voltages from first and second phases, respectively, of the motor 40 to the reference voltage. When the microprocessor 66 receives the interrupt/control signal from the wake-up circuit 90, the microprocessor 66 wakes up from a low power sleep mode to determine the absolute rotational position of the shaft 42.

Figure 9:
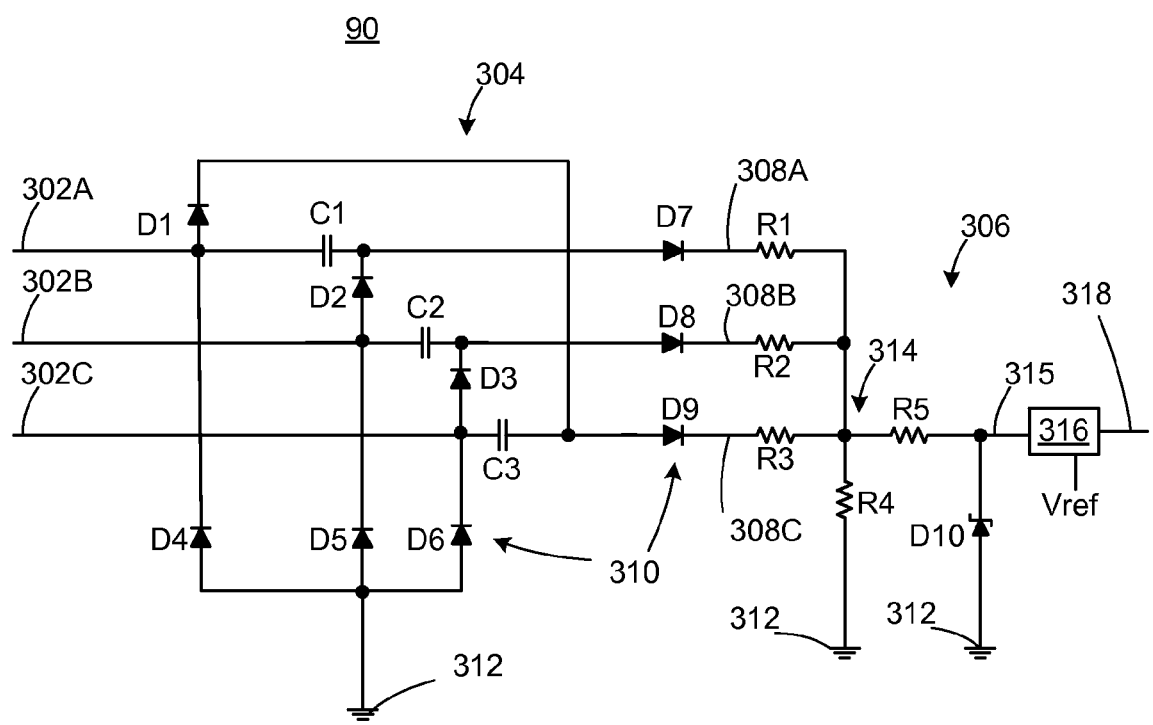
FIG. 9 is an example of a wake-up circuit that can be implemented in various embodiments.

According to an embodiment, an example of the wake-up circuit 90 is depicted in greater detail in FIG. 9, which is described with continued reference to FIGS. 1 and 2. The wake-up circuit 90 can include a plurality of inputs 302A, 302B, and 302C coupled to separate phases of the motor 40, e.g., phase A, phase B, and phase C, offset by about 120 degrees. The wake-up circuit 90 also includes a voltage boosting circuit 304 operable to increase a back EMF voltage induced on one or more of the inputs 302A-302C by rotation of the rotatable shaft 42 of the motor 40 and produces at least one voltage-boosted back EMF voltage.

The voltage boosting circuit 304 includes at least one capacitor in-line with each of the inputs 302A-302C. In the example of FIG. 9, capacitor C1 is in-line with input 302A, capacitor C2 is in-line with input 302B, and capacitor C3 is in-line with input 302C. The voltage boosting circuit 304 can charge the capacitors C1-C3 on a first cycle polarity of each of the respective inputs 302A-302C and effectively doubles the back EMF voltage on a second cycle polarity opposite the first cycle polarity to produce voltage-boosted back EMF voltage. For example, when input 302A is negative, C1 gets charged. When input 302A is positive, C1 is fully charged and the instantaneous forward line voltage is substantially doubled at phase output node 308A to produce a voltage-boosted back EMF voltage. The speed of motor 40, diode drops, resistances, as well as component tolerances, may result in an effective voltage doubling but not precise doubling. The positive/negative cycle relationship can be reversed if the input 302A is inverted. Similarly, assuming a non-inverting sinusoidal signal, when input 302B is negative, C2 gets charged. When input 302B is positive, C2 is fully charged and the instantaneous forward line voltage is substantially doubled at phase output node 308B to produce a voltage-boosted back EMF voltage. Likewise, assuming a non-inverting sinusoidal signal, when input 302C is negative, C3 gets charged. When input 302C is positive, C3 is fully charged and the instantaneous forward line voltage is substantially doubled at phase output node 308C to produce a voltage-boosted back EMF voltage. The effective voltage doubling of the voltage boosting circuit 304 can increase sensitivity of the wake-up circuit 90 to movement of the rotatable shaft 42 such that rapid wake-up of the monitoring system 68 may be performed. Additionally, the effective voltage doubling of the voltage boosting circuit 304 can support a wider variety of motors as the motor 40, such as motors having a lower back-EMF constant $K_e$.

Blocking diodes can be positioned between pairs of the inputs 302A-302C to prevent the capacitors C1-C3 in-line with each of the inputs 302A-302C from discharging into the phases of the motor 40. As depicted in FIG. 9, blocking diode D1 is coupled to an input side of capacitor C1 and an output side of capacitor C3 in relation to inputs 302A and 302C. Blocking diode D2 is coupled to an input side of capacitor C2 and an output side of capacitor C1 in relation to inputs 302B and 302A. Blocking diode D3 is coupled to an input side of capacitor C3 and an output side of capacitor C2 in relation to inputs 302C and 302B.

The wake-up circuit 90 can also include a full-wave rectifier circuit 310, where at least one of the capacitors C1-C3 on each of the inputs 302A-302C of the voltage boosting circuit 304 is positioned between a diode pair of the full-wave rectifier circuit 310 for each of the inputs 302A-302C. Examples of diode pairs include diodes D4 and D7 relative to input phase 302A, diodes D5 and D8 relative to input phase 302B, and diodes D6 and D9 relative to input phase 302C. A first diode of a diode pair establishes a ground reference for one of the phases of the motor 40, and a second diode of the diode pair establishes an instantaneous forward voltage at a phase output node 308 for a comparator circuit 316. In the example of FIG. 9, diode D4 is connected between ground 312 and an input side of capacitor C1 on input 302A, while diode D7 is connected between an output side of capacitor C1 and phase output node 308A. Diode D5 is connected between ground 312 and an input side of capacitor C2 on input 302B, while diode D8 is connected between an output side of capacitor C2 and phase output node 308B. Diode D6 is connected between ground 312 and an input side of capacitor C3 on input 302C, while diode D9 is connected between an output side of capacitor C3 and phase output node 308C. It will be understood that additional components can be included, such as current limiting resistors between diodes D4-D6 and ground 312.

The wake-up circuit 90 can also include a scaling and protection circuit 306. In the example of FIG. 9, the scaling and protection circuit 306 includes a voltage divider circuit 314 and a voltage clamp D10. Resistors R1, R2, R3, and R4 form a voltage divider relative to the voltage at phase output nodes 308A-308C. The scaling and protection circuit 306 may also include at least one current limiting resistor R5 positioned between the voltage divider circuit 314 and the voltage clamp D10. The voltage clamp D10 may be a Zener diode. The voltage clamp D10 may be selected based on voltage requirements of the monitoring system 68, such as an expected voltage level for an input to the microprocessor 66. A comparator input node 315 is established between the current limiting resistor R5 and the voltage clamp D10 in the embodiment of FIG. 9.

The wake-up circuit 90 can also include a comparator circuit 316 operable to compare the at least one voltage-boosted back EMF voltage to a reference voltage and trigger the monitoring system 68 to perform the determination of the absolute rotational position of the rotatable shaft 42 of the motor 40 based on a result of the compare during an ignition off state of the vehicle 10. The comparator circuit 316 can include a comparator or equivalent circuit that compares voltage at comparator input node 315 to a reference voltage and outputs a control signal 318 to trigger the monitoring system 68, for instance, based on the voltage at comparator input node 315 exceeding the reference voltage. The voltage at comparator node 315 can be a scaled version of the output of the voltage boosting circuit 304 and indicative of a voltage-boosted back EMF voltage. Additionally, the voltage at the comparator node 315 can be limited by voltage clamp D10. The reference voltage may be an absolute or relative voltage. In some embodiments, the reference voltage is configurable. While the comparator circuit 316 is depicted as located within a bounded box defining the wake-up circuit 90, it will be understood that the comparator circuit 316 can be located at a distance from other elements of the wake-up circuit 90. For example, the comparator circuit 316 can be located in whole or in part within the microprocessor 66.

Figure 3:
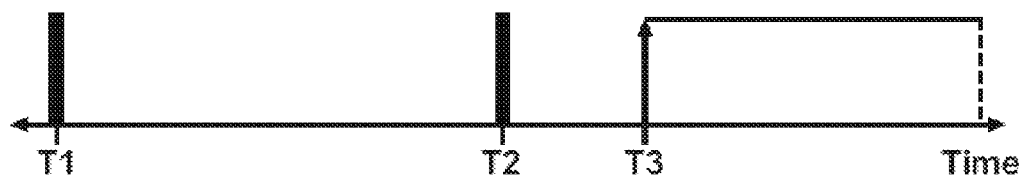
FIG. 3 is an exemplary timing diagram indicating when the position determination system monitors the handwheel position during an ignition off state of the vehicle.

Referring to FIGS. 2 and 3, the microprocessor 66 is operably coupled to the voltage regulator 82, the switch 84, the first and second position sensors 60, 62, the timer circuit 70, the memory device 74, the wake-up circuit 90, and the main controller 92. The microprocessor 66 determines the absolute rotational position of the shaft 42 during the vehicle ignition off state by being periodically activated by a control signal from the timer circuit 70 or by being activated by an interrupt/control signal from the wake-up circuit 90. In particular, in one exemplary embodiment, the microprocessor 66 is periodically activated by the timer circuit 70 to periodically monitor the first and second position signals from the first and second position sensors 60, 62 during the ignition off state of the vehicle 10. For example, the timer circuit 70 can wake up or activate the microprocessor 66 at times T1 and T2 representing a 256 millisecond time interval between activations. After, the microprocessor 66 is activated, the microprocessor 66 measures the first and second position signals from the position sensors 60, 62 for 50-100 μsecond and then is de-activated. The microprocessor 66 has an activation duty cycle that is defined by a desired quiescent current draw of the microprocessor 66 and a desired maximum speed of the shaft 42. Also, the microprocessor 66 can be activated at a time T3 by an interrupt/control signal from the wake-up circuit 90. The operation of the microprocessor 66 will be discussed in greater detail below.

Figure 6:
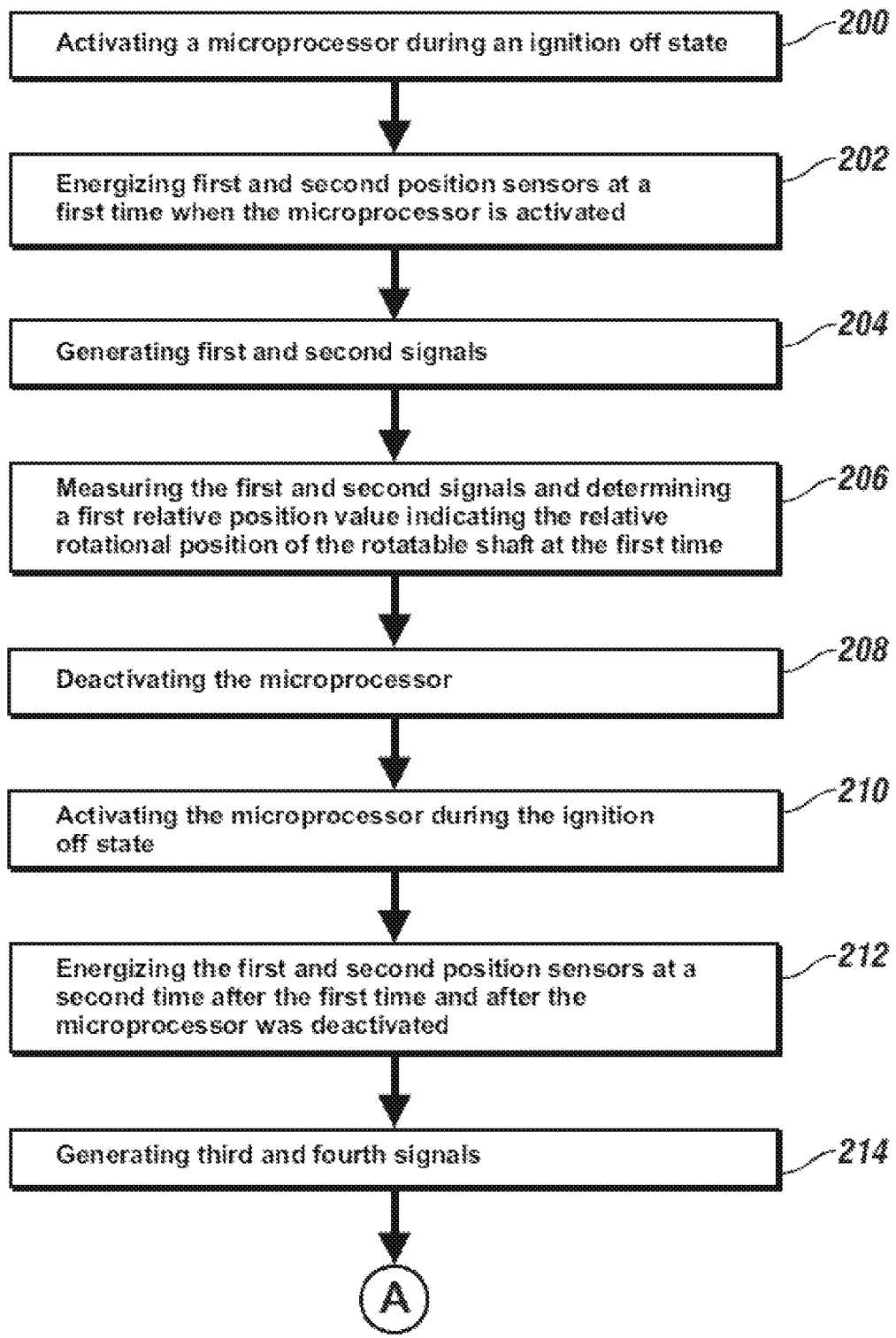
FIGS. 6 and 7 are flowcharts of a method for determining an absolute rotational position of a rotatable shaft of a motor in the electric power system of FIG. 1 in accordance with another exemplary embodiment.
Figure 7:
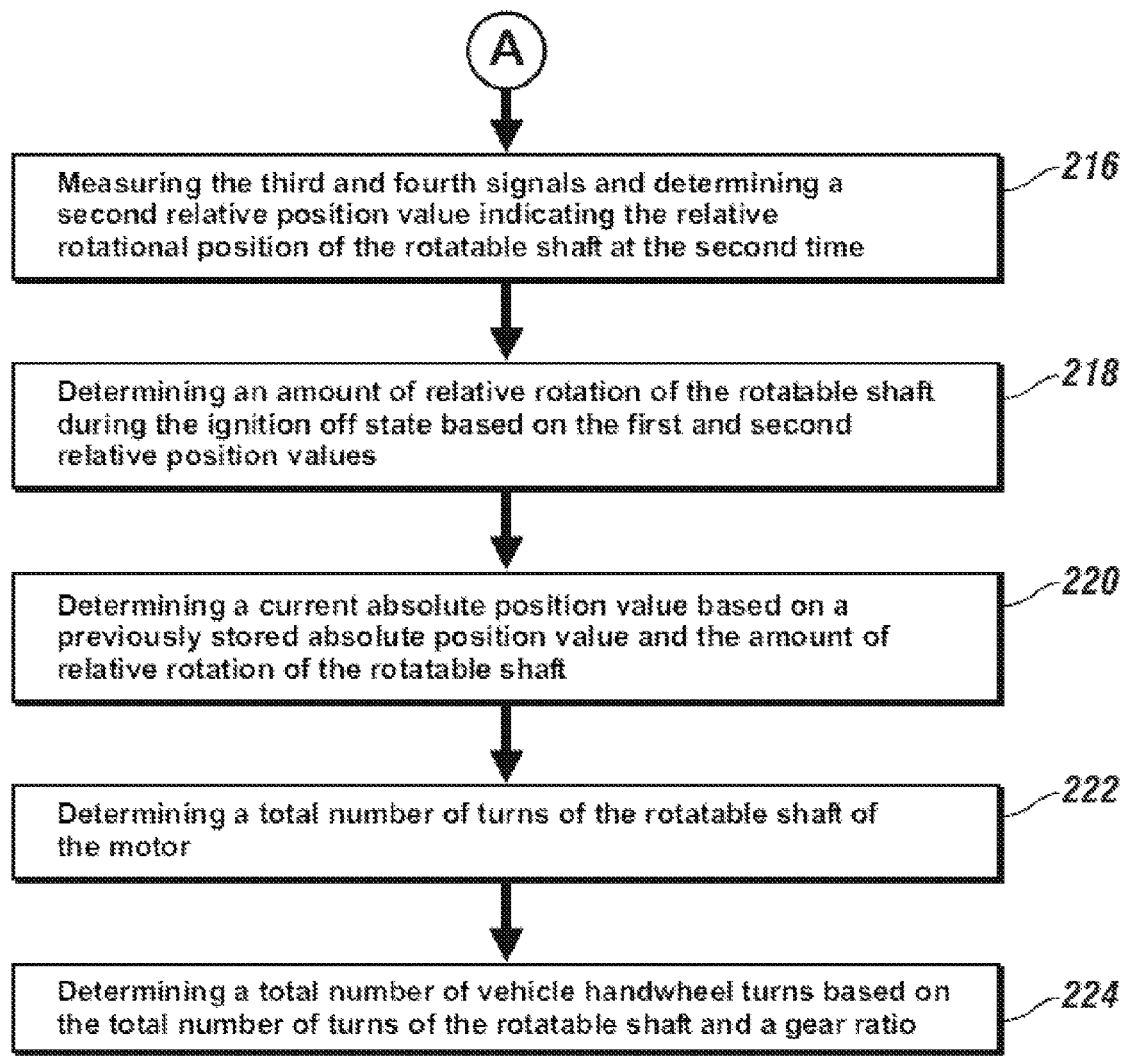

Referring to FIGS. 2, 6 and 7, a flowchart of a method for determining an absolute rotational position of the rotatable shaft 42 of the motor 40 in the electric power steering system 24 in accordance with an exemplary embodiment will be explained.

At step 200, the timer circuit 70 generates a control signal to activate the microprocessor 66 during an ignition off state of the vehicle 10.

At step 202, the microprocessor 66 generates a control signal that induces the switch 84 to supply an operational voltage to the first and second position sensors 60, 62 to energize the first and second position sensors 60, 62 at a first time when the microprocessor 66 is activated.

At step 204, the first and second position sensors 60, 62 generate first and second signals, respectively, indicative of a relative rotational position of the rotatable shaft 42 at the first time.

At step 206, the microprocessor 66 measures the first and second signals and determines a first relative position value indicating the relative rotational position of the rotatable shaft 42 at the first time and stores the first relative position value in the memory device 74. In one exemplary embodiment, the first relative position value is determined utilizing the following equation: first relative position value=ArcTan (amplitude of signal curve 124 at the first time/amplitude of signal curve 122 at the first time) wherein signal curves 122, 124 are shown in FIG. 4.

At step 208, the microprocessor 66 deactivates itself after storing the first relative position value in the memory device 74.

At step 210, the timer circuit 70 generates a control signal to activate the microprocessor 66 during the ignition off state of the vehicle 10.

At step 212, the microprocessor 66 generates a control signal that induces the switch 84 to supply an operational voltage to the first and second position sensors 60, 62 to energize the first and second position sensors 60, 62 at a second time after the first time and after the microprocessor 66 was deactivated.

At step 124, the first and second position sensors 60, 62 generate third and fourth signals, respectively, indicative of a relative rotational position of the rotatable shaft 42 at the second time.

At step 216, the microprocessor 66 measures the third and fourth signals and determines a second relative position value indicating the relative rotational position of the rotatable shaft 42 at the second time based on the third and fourth signals, and stores the second relative position value in the memory device 74.

At step 218, the microprocessor 66 determines an amount of relative rotation of the rotatable shaft 42 during the ignition off state based on the first and second relative position values, and stores the amount of relative rotation in the memory device 74. In one exemplary embodiment, the amount of relative rotation is determined utilizing the following equation: amount of relative rotation=first relative position value−second relative position value.

At step 220, the microprocessor 66 determines a current absolute position value indicating a current absolute rotational position of the rotatable shaft 42 based on a previously stored absolute position value and the amount of relative rotation of the rotatable shaft 42, and stores the current absolute position value in the memory device 74. In particular, the current absolute position value is calculated utilizing the following equation: current absolute position value=previously stored absolute position value+amount of relative rotation of the rotatable shaft 42.

At step 222, the microprocessor 66 determines a total number of turns of the rotatable shaft 42 of the motor 40 by dividing the current absolute rotational position of the rotatable shaft 42 by 360 degrees, and stores the total number of turns of the rotatable shaft 42 of the motor 40 in the memory device 74. In particular, the total number of turns of the rotatable shaft 42 is calculated utilizing the following equation: total number of turns of the rotatable shaft 42=current absolute rotational position of the rotatable shaft 42/360 degrees.

At step 224, the microprocessor 66 determines a total number of vehicle handwheel turns based on the total number of turns of the rotatable shaft 42 of the motor 40 and a gear ratio associated with the electric power steering system, and stores the total number of vehicle handwheel turns in the memory device 74. In one exemplary embodiment, the total number of vehicle handwheel turns is determined utilizing the following equation: total number of vehicle handwheel turns =the total number of turns of the rotatable shaft 42 of the motor 40/gear ratio associated with the electric power steering system.

Figure 8:
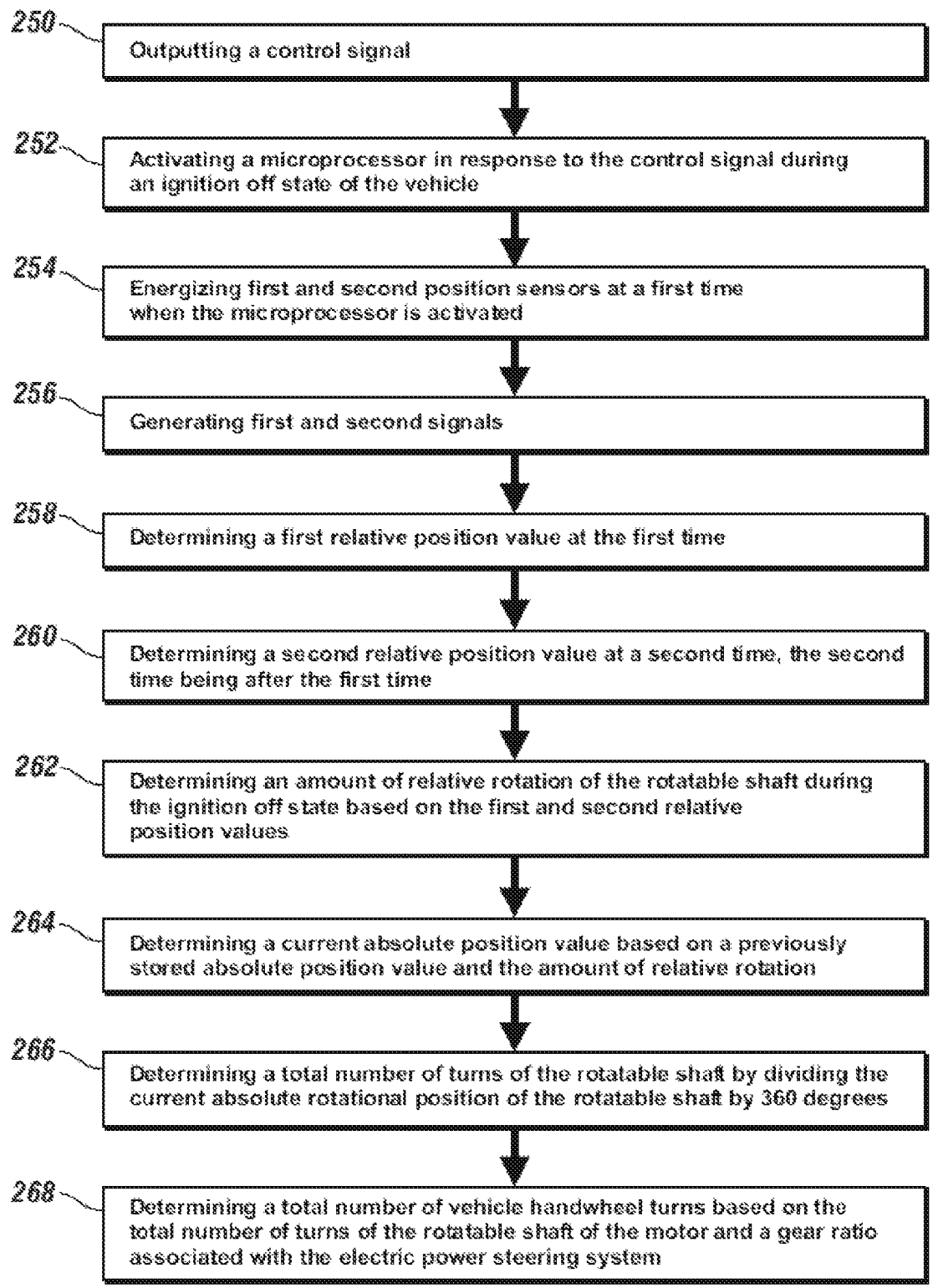
FIG. 8 is a flowchart of another method for determining an absolute rotational position of a rotatable shaft of a motor in the electric power system of FIG. 1 in accordance with another exemplary embodiment.

Referring to FIGS. 2, 8, and 9, a flowchart of another method for determining an absolute rotational position of the rotatable shaft 42 of the motor 40 in the electric power steering system 24 in accordance with another exemplary embodiment will be explained.

At step 250, the wake-up circuit 90 compares first and second back electromotive force voltages from first and second phases, respectively, of the motor 40 to a reference voltage, and outputs a control signal when either the first back electromotive force voltage is greater than the reference voltage or the second back electromotive force voltage is greater than the reference voltage.

The back EMF voltage induced on one or more inputs 302A-302C from separate phases of the motor 40 by rotation of the rotatable shaft 42 is increased to produce at least one voltage-boosted back EMF voltage. Increasing the back EMF voltage can be performed by a voltage boosting circuit 304 that includes at least one capacitor C1-C3 in-line with each of the inputs 302A-302C. The capacitors C1-C3 can be charged on a first cycle polarity of each of the inputs 302A-302C. The back EMF voltage may be effectively doubled on a second cycle polarity opposite the first cycle polarity to produce the voltage-boosted back EMF voltage, and the voltage-boosted back EMF voltage can be further scaled and limited prior to comparison by the comparator circuit 316. A blocking diode, such as blocking diodes D1-D3, can be used to prevent the capacitors C1-C3 in-line with each of the inputs 302A-302C from discharging into the phases of the motor 40. The voltage-boosted back EMF voltage is compared to a reference voltage. The wake-up circuit 90 triggers a control signal to the monitoring system 68 based on the comparison.

At step 252, the microprocessor 66 is activated in response to the control signal during an ignition off state of the vehicle 10.

At step 254, the microprocessor 66 generates a control signal that induces the switch 84 to supply an operational voltage to the first and second position sensors 60, 62 to energize the first and second position sensors 60, 62 at a first time when the microprocessor 66 is activated.

At step 256, the first and second position sensors 60, 62 generate first and second signals, respectively, indicative of a relative rotational position of the rotatable shaft 42 over time.

At step 258, the microprocessor 66 measures the first and second signals and determines a first relative position value indicating a relative rotational position of the rotatable shaft 42 at the first time, and stores the first relative position value in the memory device 74.

At step 260, the microprocessor 66 measures the first and second signals and determines a second relative position value indicating a relative position of the rotatable shaft 42 at a second time and stores the second relative position value in the memory device 74. The second time is after the first time.

At step 262, the microprocessor 66 determines an amount of relative rotation of the rotatable shaft 42 during the ignition off state based on the first and second relative position values, and stores the amount of relative rotation in the memory device 74.

At step 264, the microprocessor 66 determines a current absolute position value indicating a current absolute rotational position of the rotatable shaft 42 based on a previously stored absolute position value and the amount of relative rotation of the rotatable shaft 42, and stores the current absolute position value in the memory device 74.

At step 266, the microprocessor 66 determines a total number of turns of the rotatable shaft 42 of the motor 40 by dividing the current absolute rotational position of the rotatable shaft 42 by 360 degrees, and stores the total number of turns of the rotatable shaft 42 of the motor 40 in the memory device 74.

At step 268, the microprocessor 66 determines a total number of vehicle handwheel turns based on the total number of turns of the rotatable shaft 42 of the motor 40 and a gear ratio associated with the electric power steering system, and stores the total number of vehicle handwheel turns in the memory device 74.

It should be noted that the microprocessor 66 can operate in a low power mode drawing less than 70 µA when there is no movement of the shaft 42. The microprocessor 66 can also monitor rotational speeds of the shaft 42 up to 11,000 RPM and has a resolution of one-half of a mechanical revolution of the shaft 42. In addition, the microprocessor 66 can determine +/−1080° of handwheel movement (e.g., three handwheel revolutions).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed or contemplated for carrying out this invention, but that the invention will include all embodiments falling within the scope of the present application.

What is claimed is:

1. A wake-up circuit for triggering a determination of an absolute rotational position of a rotatable shaft of a motor in an electric power steering system of a vehicle, the wake-up circuit comprising:
   a plurality of inputs coupled to separate phases of the motor;
   a voltage boosting circuit operable to increase a back electromotive force (EMF) voltage induced on one or more of the inputs by rotation of the rotatable shaft of the motor and produce at least one voltage-boosted back EMF voltage, the voltage boosting circuit comprising at least one capacitor in-line with each of the inputs and a blocking diode positioned between pairs of the inputs to prevent the at least one capacitor in-line with each of the inputs from discharging into the phases of the motor; and
   a comparator circuit operable to compare the at least one voltage-boosted back EMF voltage to a reference voltage and trigger a monitoring system to perform the determination of the absolute rotational position of the rotatable shaft of the motor in the electric power steering system of the vehicle based on a result of the compare during an ignition off state of the vehicle.

2. The wake-up circuit of claim 1, wherein the voltage boosting circuit charges the at least one capacitor on a first cycle polarity of each of the inputs and effectively doubles the back EMF voltage on a second cycle polarity opposite the first cycle polarity to produce the at least one voltage-boosted back EMF voltage.

3. The wake-up circuit of claim 1, further comprising a full-wave rectifier circuit, wherein the at least one capacitor on each of the inputs of the voltage boosting circuit is positioned between a diode pair of the full-wave rectifier circuit for each of the inputs.

4. The wake-up circuit of claim 3, wherein a first diode of the diode pair establishes a ground reference for one of the phases of the motor, and a second diode of the diode pair establishes an instantaneous forward voltage for the comparator circuit.

5. A wake-up circuit for triggering a determination of an absolute rotational position of a rotatable shaft of a motor in an electric power steering system of a vehicle, the wake-up circuit comprising:
   a plurality of inputs coupled to separate phases of the motor;
   a voltage boosting circuit operable to increase a back electromotive force (EMF) voltage induced on one or more of the inputs by rotation of the rotatable shaft of the motor and produce at least one voltage-boosted back EMF voltage;
   a scaling and protection circuit comprising a voltage divider circuit and a voltage clamp; and
   a comparator circuit operable to compare the at least one voltage-boosted back EMF voltage to a reference voltage and trigger a monitoring system to perform the determination of the absolute rotational position of the rotatable shaft of the motor in the electric power steering system of the vehicle based on a result of the compare during an ignition off state of the vehicle.

6. The wake-up circuit of claim 5, wherein the scaling and protection circuit further comprises at least one current limiting resistor positioned between the voltage divider circuit and the voltage clamp, and a comparator input voltage indicative of the at least one voltage-boosted back EMF voltage is established between the at least one current limiting resistor and the voltage clamp.

7. A system for determining an absolute rotational position of a rotatable shaft of a motor in an electric power steering system of a vehicle, the system comprising:
   a wake-up circuit comprising a voltage boosting circuit and a comparator circuit, the voltage boosting circuit operable to increase a back electromotive force (EMF) voltage induced on one or more inputs by rotation of the rotatable shaft of the motor and produce at least one voltage-boosted back EMF voltage, the voltage boosting circuit comprises at least one capacitor in-line with each of the inputs and positioned between a diode pair of a full-wave rectifier circuit for each of the inputs, the comparator circuit operable to compare the at least one voltage-boosted back EMF voltage to a reference voltage and output a control signal based on a result of the compare during an ignition off state of the vehicle; and
   a monitoring system comprising a microprocessor and first and second position sensors operable to generate signals indicative of a relative rotational position of the rotatable shaft, the microprocessor configured to activate in response to the control signal and determine a current absolute position value indicating a current absolute rotational position of the rotatable shaft based on a previously stored absolute position value and an amount of relative rotation of the rotatable shaft based on the signals from the first and second position sensors.

8. The system of claim 7, wherein the voltage boosting circuit charges the at least one capacitor on a first cycle polarity of each of the inputs and effectively doubles the back EMF voltage on a second cycle polarity opposite the first cycle polarity to produce the at least one voltage-boosted back EMF voltage.

9. The system of claim 7, wherein a first diode of the diode pair establishes a ground reference for one phase of the motor, and a second diode of the diode pair establishes an instantaneous forward voltage for the comparator circuit.

10. The system of claim 7, wherein the wake-up circuit further comprises a blocking diode positioned between pairs of the inputs to prevent the at least one capacitor in-line with each of the inputs from discharging into phases of the motor.

11. The system of claim 7, wherein the wake-up circuit further comprises a scaling and protection circuit comprising a voltage divider circuit and a voltage clamp.

12. The system of claim 11, wherein the scaling and protection circuit further comprises at least one current limiting resistor positioned between the voltage divider circuit and the voltage clamp, and a comparator input voltage indicative of the at least one voltage-boosted back EMF voltage is established between the at least one current limiting resistor and the voltage clamp.

13. A method for triggering a determination of an absolute rotational position of a rotatable shaft of a motor in an electric power steering system of a vehicle, the method comprising:
  increasing a back electromotive force (EMF) voltage induced on one or more inputs from separate phases of the motor by rotation of the rotatable shaft to produce at least one voltage-boosted back EMF voltage, the increasing performed by a voltage boosting circuit comprising at least one capacitor in-line with each of the inputs that charges the at least one capacitor on a first cycle polarity of each of the inputs and effectively doubling the back EMF voltage on a second cycle polarity opposite the first cycle polarity to produce the at least one voltage-boosted back EMF voltage;
  comparing the at least one voltage-boosted back EMF voltage to a reference voltage; and
  triggering a monitoring system to perform the determination of the absolute rotational position of the rotatable shaft of the motor in the electric power steering system of the vehicle based on a result of the comparing during an ignition off state of the vehicle.

14. The method of claim 13, wherein the at least one capacitor on each of the inputs is positioned between a diode pair of a full-wave rectifier circuit for each of the inputs.

15. The method of claim 13, further comprising preventing the at least one capacitor in-line with each of the inputs from discharging into the phases of the motor.

* * * * *